United States Patent

Tamaizumi

(10) Patent No.: US 11,613,303 B2
(45) Date of Patent: Mar. 28, 2023

(54) TURNING SYSTEM

(71) Applicant: JTEKT CORPORATION, Osaka (JP)

(72) Inventor: Terutaka Tamaizumi, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 362 days.

(21) Appl. No.: 16/848,959

(22) Filed: Apr. 15, 2020

(65) Prior Publication Data
US 2020/0339186 A1    Oct. 29, 2020

(30) Foreign Application Priority Data

Apr. 26, 2019 (JP) .............................. JP2019-086314

(51) Int. Cl.
| B62D 5/04 | (2006.01) |
| B62D 6/00 | (2006.01) |
| B62D 5/00 | (2006.01) |
| B62D 15/02 | (2006.01) |

(52) U.S. Cl.
CPC ........... B62D 5/0463 (2013.01); B62D 5/006 (2013.01); B62D 15/021 (2013.01)

(58) Field of Classification Search
None
See application file for complete search history.

(56) References Cited

U.S. PATENT DOCUMENTS

| 2006/0047391 A1 | 3/2006 | Katou | |
| 2008/0035411 A1* | 2/2008 | Yamashita | B62D 5/049 |
| | | | 180/443 |
| 2016/0221601 A1* | 8/2016 | Barthomeuf | B62D 5/0469 |
| 2017/0066476 A1 | 3/2017 | Kudo | |
| 2019/0270482 A1 | 9/2019 | Nakakuki et al. | |

FOREIGN PATENT DOCUMENTS

| DE | 10048579 A1 | 4/2002 |
| EP | 3138759 A1 | 3/2017 |
| JP | 2006-175940 A | 7/2006 |
| JP | 2007-045394 A | 2/2007 |
| WO | 2018/055805 A1 | 3/2018 |

OTHER PUBLICATIONS

Sep. 17, 2020 Search Report issued in European Patent Application No. 20171083.7.

* cited by examiner

Primary Examiner — Adam D Tissot
Assistant Examiner — Laura E Linhardt
(74) Attorney, Agent, or Firm — Oliff PLC

(57) ABSTRACT

A turning system includes a steering wheel, a turning actuator that has an electric motor incorporated thereinto and turns turning wheels, and a control device. The control device is configured to perform: a steering operation amount calculating process of calculating a steering operation amount; an angle command value calculating process of calculating an angle command value; an angle operation amount calculating process of calculating an angle operation amount; an operation process of operating a drive circuit of the electric motor; and a correction process of correcting a parameter upstream from the angle operation amount calculating process such that a drag force resisting an operation of the steering wheel for increasing magnitude of the turning angle is applied when the magnitude of the turning angle is equal to or greater than a turning angle threshold value.

7 Claims, 8 Drawing Sheets

TURNING SYSTEM

CROSS-REFERENCE TO RELATED APPLICATION

This application claims priority to Japanese Patent Application No. 2019-086314 filed on Apr. 26, 2019, incorporated herein by reference in its entirety.

BACKGROUND

1. Technical Field

The disclosure relates to a turning system that operates a turning actuator having an electric motor incorporated thereinto and turning a turning wheel.

2. Description of Related Art

For example, Japanese Patent Application Publication No. 2006-175940 (JP 2006-175940 A) discloses a device that operates an electric motor which is incorporated into a turning actuator which turns turning wheels based on an operation amount in feedback control based on a difference between a target steering torque and an actual steering torque and an operation amount in feedback control based on a difference between a target turning angle and a turning angle.

In an electric power steering system (a steering assist system), it is generally known that turning by a tire angle of a predetermined amount or more is prohibited. Specifically, for example, in a rack and pinion type, it is well known that so-called end contact in which an end of a rack shaft comes into contact with a rack housing occurs and thus turning by the tire angle more is prohibited. In this regard, Japanese Patent Application Publication No. 2007-045394 (JP 2007-045394 A) discloses a device that puts limitations to slowly decrease a current command value of an electric motor when an end of a rack shaft gets close to a rack housing.

SUMMARY

In the device described in JP 2006-175940 A, at the time of control for slowly decreasing the current command value of the electric motor when the end of the rack shaft gets close to the rack housing, there is concern that a driver may not be aware that the magnitude of a steering angle is close to a maximum value until the end of the rack shaft comes into contact with the rack housing. When a driver cannot be aware thereof, there is concern that a state in which a torque which is input to a steering wheel by the driver is greater may be maintained and thus the end of the rack shaft may come into contact with the rack housing with a large force.

An aspect of the disclosure is a turning system. The turning system includes a steering wheel, a turning actuator that has an electric motor incorporated thereinto and is configured to turn turning wheels, and a control device. The control device is configured to perform: a steering operation amount calculating process of calculating a steering operation amount, the steering operation amount is an operation amount which is convertible to a torque required for the electric motor as an operation amount of the electric motor for turning the turning wheels to control a steering torque to a target steering torque by feedback control, the steering torque is input by a driver; an angle command value calculating process of calculating an angle command value, the angle command value is a command value of a convertible angle that is convertible to a turning angle of the turning wheels based on the steering operation amount; an angle operation amount calculating process of calculating an angle operation amount which is an operation amount which is convertible to a torque required for the electric motor as an operation amount for controlling the convertible angle to the angle command value by feedback control; an operation process of operating a drive circuit of the electric motor to control the torque of the electric motor based on the angle operation amount; and a correction process of correcting a parameter upstream from the angle operation amount calculating process such that a drag force resisting an operation of the steering wheel for increasing magnitude of the turning angle is applied when the magnitude of the turning angle is equal to or greater than a turning angle threshold value.

With this configuration, by applying a drag force resisting an operation of the steering wheel for increasing the magnitude of the turning angle when the magnitude of the turning angle is equal to or greater than the turning angle threshold value, it is possible to limit the magnitude of a force for increasing the magnitude of the turning angle to decrease even when a driver performs an operation for increasing a large force for increasing the magnitude of the turning angle. In order to apply the drag force resisting the operation of the steering wheel, a parameter upstream from the angle operation amount calculating process is corrected. Accordingly, in comparison with a case in which an output of the angle operation amount calculating process is corrected, it is possible to curb deterioration in controllability of feedback control of the turning angle to the target turning angle.

In the turning system, the angle command value calculating process may include a process of subtracting an elastic force which is set to be greater when the magnitude of the turning angle is great than when the magnitude of the turning angle is small from the steering operation amount that is an input of the angle command value calculating process and a process of calculating the angle command value based on a subtracted value. The correction process may include a process of increasing an increase of the elastic force with an increase in the magnitude of the turning angle when the magnitude of the turning angle is equal to or greater than the turning angle threshold value.

With this configuration, since the elastic force which is set to be greater when the magnitude of the turning angle is great than when the magnitude of the turning angle is small is subtracted from the steering operation amount which is an input of the angle command value calculating process and the angle command value is calculated based on the subtracted value, it can be expressed that the torque required for turning the turning wheels becomes greater when the magnitude of the turning angle is great than when the magnitude of the turning angle is small. By setting the increase of the elastic force to increase when the magnitude of the turning angle is equal to or greater than the turning angle threshold value, it is possible to apply a drag force resisting an operation of the steering wheel for increasing the magnitude of the turning angle when the turning angle is equal to or greater than the turning angle threshold value.

In the turning system, the angle command value calculating process may include a process of subtracting a sticky force which is set to be greater when the magnitude of a turning angular velocity is great than when magnitude of the turning angular velocity is small from the steering operation amount that is an input of the angle command value calculating process and a process of calculating the angle command value based on the subtracted value. The turning angular velocity is a change rate of the turning angle. The control device may be configured to perform a stickiness adjusting process of setting the sticky force to be greater when the magnitude of the turning angle is equal to or less than the turning angle threshold value and the magnitude of the turning angle is closer to the turning angle threshold value than when the magnitude of the turning angle is farther from the turning angle threshold value.

When the drag force resisting an operation of the steering wheel for increasing the magnitude of the turning angle when the turning angle is equal to or greater than the turning angle threshold value is applied, there is concern that an impact due to collision between forces in the opposite directions such as a force for increasing the magnitude of the turning angle and the drag force may increase when the turning angle reaches the turning angle threshold value and a rate of change of the turning angle is great. Therefore, in this configuration, by setting the sticky force to be greater when the magnitude of the turning angle is close to the turning angle threshold value than when the magnitude of the turning angle is far from the turning angle threshold value, the sticky force is likely to increase in the vicinity of the turning angle threshold value and thus it is possible to curb an increase of the rate of change of the turning angle. Accordingly, it is possible to curb an excessive increase of the rate of change of the magnitude of the turning angle when the turning angle reaches the turning angle threshold value and to suppress the impact.

In the turning system, the correction process may include a process of decreasing the magnitude of the steering operation amount that is input to the angle command value calculating process when the magnitude of the turning angle is equal to or greater than the turning angle threshold value.

With this configuration, since the magnitude of the steering operation amount is decreased when the magnitude of the turning angle is equal to or greater than the turning angle threshold value, the magnitude of the input of the angle command value calculating process can be decreased when the magnitude of the turning angle is equal to or greater than the turning angle threshold value. Accordingly, since the magnitude of the angle command value is calculated to be smaller than the magnitude of the steering torque in the angle command value calculating process, the magnitude of the convertible angle is likely to be greater than the magnitude of the angle command value. In this case, since the angle operation amount which is calculated in the angle operation amount calculating process is an amount for decreasing the magnitude of the turning angle, it is possible to apply a drag force resisting an operation of the steering wheel for further increasing the magnitude of the turning angle.

In the turning system, the steering wheel may be attached to a drag force actuator. The drag force actuator may be configured to apply the drag force that is a force resisting the operation of the steering wheel to the steering wheel in a state in which transmission of power between the turning wheels and the steering wheel is cut off. The control device may be configured to perform a drag force operating process of operating the drag force actuator in accordance with the angle command value. The correction process may be a process of correcting the parameter upstream from the angle operation amount calculating process such that the drag force resisting the operation of the steering wheel for increasing the magnitude of the turning angle is applied by the drag force actuator when at least one of a condition that the magnitude of a steering angle which is a rotational angle of the steering wheel is equal to or greater than a steering angle threshold value and a condition that the turning angle is equal to or greater than the turning angle threshold value is satisfied.

With this configuration, when a logical sum of the steering angle reaching the steering angle threshold value and the turning angle reaching the turning angle threshold value is true, a drag force resisting an operation of the steering wheel for increasing the magnitude of the steering angle is applied. Accordingly, it is possible to prevent a phenomenon in which a steering operation of causing the magnitude of the turning angle to exceed an upper limit and a steering operation of causing the magnitude of the steering angle to exceed an upper limit are performed.

In the turning system, the operation process may be a process of operating the drive circuit such that the torque of the electric motor is controlled based on the angle operation amount regardless of the steering operation amount.

In the turning system, the control device may be configured to perform a target steering torque calculating process of calculating the target steering torque based on a sum of amounts that are obtained by converting the steering operation amount and the steering torque to a force acting on the same object.

Since the steering operation amount can be converted to a torque required for the electric motor, a force which is applied from the vehicle side to turn the turning wheels is determined based on the steering operation amount and the steering torque and this force can be converted to a lateral force. On the other hand, a target steering torque which is required for improving a feeling of steering for a driver is likely to be determined based on the lateral force. Accordingly, with the above-mentioned configuration, it is possible to easily design the target steering torque calculating process by determining the target steering torque based on the sum thereof.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
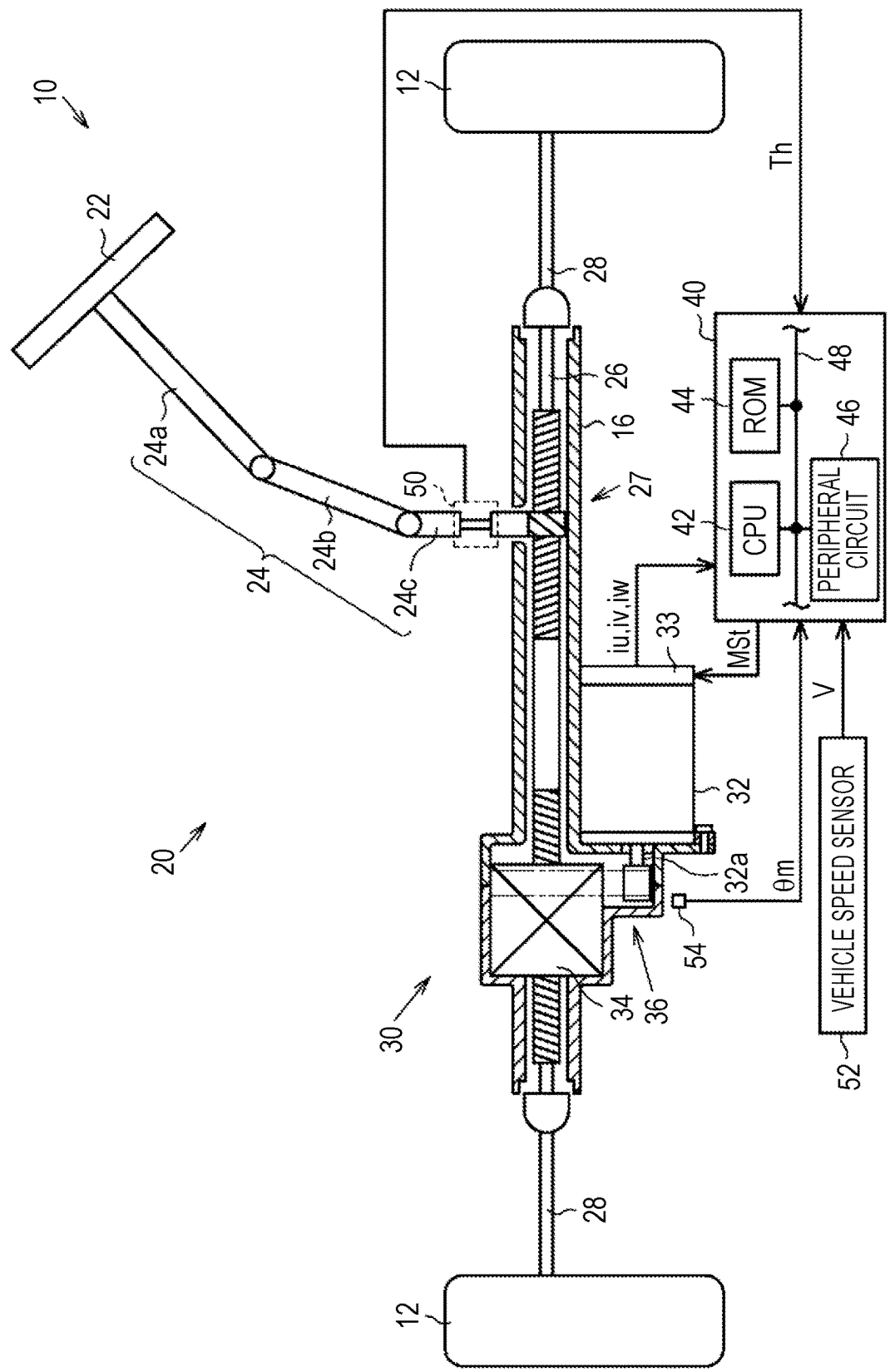
FIG. 1 is a diagram illustrating an electric power steering system according to a first embodiment.

Hereinafter, a turning control system according to a first embodiment will be described with reference to the accompanying drawings. As illustrated in FIG. 1, an electric power steering system 10 includes a steering mechanism 20 that turns turning wheels 12 based on a driver's operation of a steering wheel 22 and a turning actuator 30 that electrically turns the turning wheels 12.

The steering mechanism 20 includes a steering wheel 22, a steering shaft 24 that is fixed to the steering wheel 22, and a rack and pinion mechanism 27. The steering shaft 24 includes a column shaft 24a that is connected to the steering wheel 22, an intermediate shaft 24b that is connected to a bottom end of the column shaft 24a, and a pinion shaft 24c that is connected to a bottom end of the intermediate shaft 24b. A bottom end of the pinion shaft 24c is connected to a rack shaft 26 via the rack and pinion mechanism 27. Right and left turning wheels 12 are connected to both ends of the rack shaft 26 via tie rods 28. Accordingly, a rotational motion of the steering wheel 22, that is, the steering shaft 24, is converted to a translational motion in an axial direction (a right-left direction in FIG. 1) of the rack shaft 26 via the rack and pinion mechanism 27 including the pinion shaft 24c and the rack shaft 26. The translational motion is transmitted to the turning wheels 12 via the tie rods 28 connected to both ends of the rack shaft 26, whereby a turning angle of the turning wheels 12 is changed. A maximum value of a displacement of the rack shaft 26 in the axial direction is defined by a rack housing 16.

On the other hand, the turning actuator 30 shares the rack shaft 26 with the steering mechanism 20 and includes an electric motor 32, an inverter 33, a ball screw mechanism 34, and a belt type reduction gear mechanism 36. The electric motor 32 is a source of power for turning the turning wheels 12 and, for example, a three-phase surface-magnet synchronous electric motor (SPMSM) can be used as the electric motor 32 in this embodiment. The ball screw mechanism 34 is integrally attached to the surrounding of the rack shaft 26 and the belt type reduction gear mechanism 36 transmits a rotational force of an output shaft 32a of the electric motor 32 to the ball screw mechanism 34. The rotational force of the output shaft 32a of the electric motor 32 is converted to a force for translating the rack shaft 26 in the axial direction via the belt type reduction gear mechanism 36 and the ball screw mechanism 34. The turning wheels 12 can be turned by the force in the axial direction which is applied to the rack shaft 26.

A turning control system 40 controls the turning wheels 12 and operates the turning actuator 30 to control a turning angle which is a control parameter thereof. The turning control system 40 controls the control parameter with reference to a steering torque Th which is a torque input via the steering wheel 22 by a driver and detected by a torque sensor 50 or a vehicle speed V which is detected by a vehicle speed sensor 54. The turning control system 40 also refers to a rotational angle θm of the output shaft 32a which is detected by a rotational angle sensor 52 or currents iu, iv, and iw flowing in the electric motor 32. The currents iu, iv, and iw can be detected as a voltage drop provided in a shunt resistor which is provided in each leg of the inverter 33.

The turning control system 40 includes a CPU 42, a ROM 44, and a peripheral circuit 46, which are connected to each other via a communication line 48. The peripheral circuit 46 includes a circuit that generates a clock signal for defining internal operations, a power supply circuit, and a reset circuit.

Figure 2:
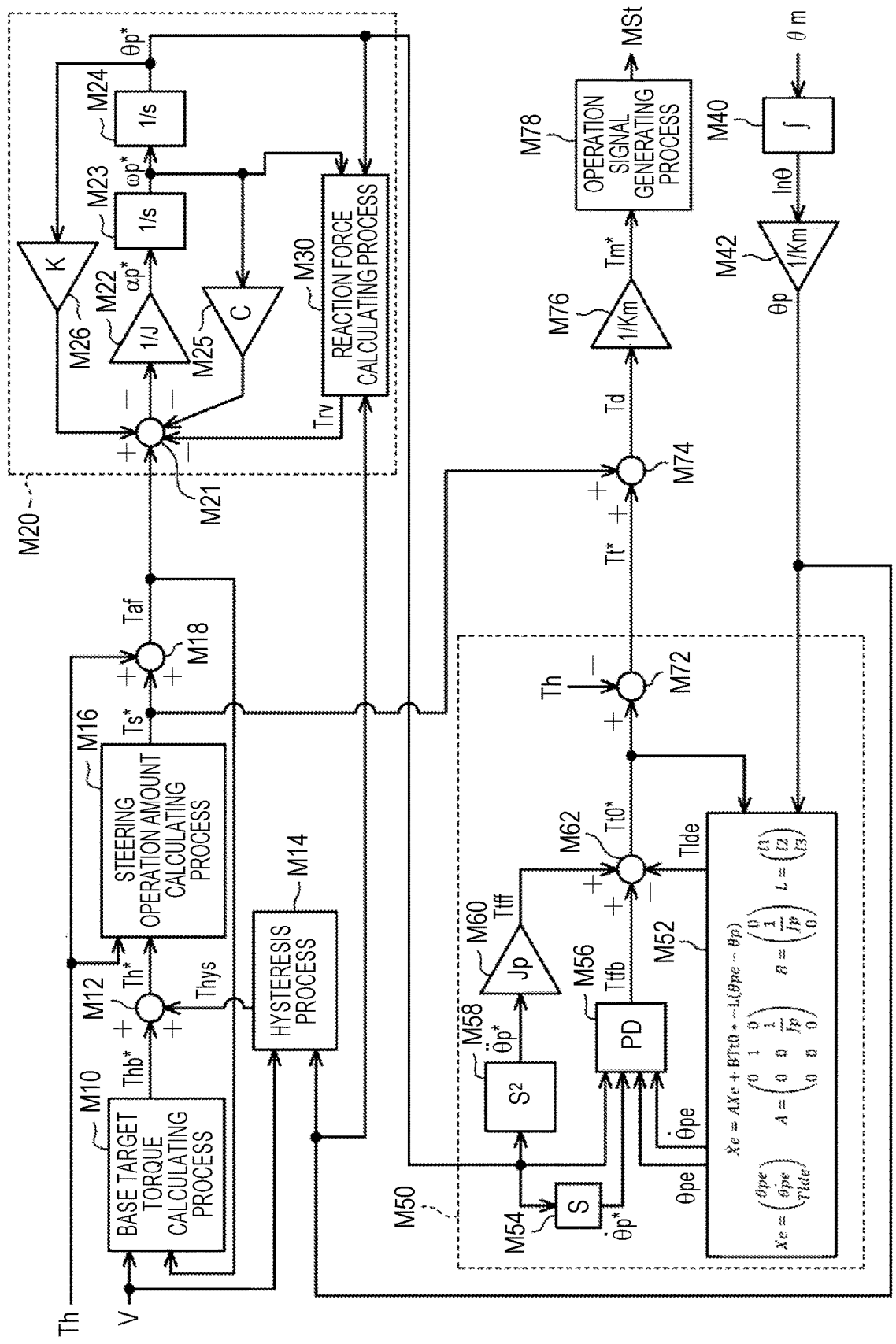
FIG. 2 is a block diagram illustrating processes which are performed by a turning control system according to the first embodiment.

FIG. 2 illustrates some processes which are performed by the turning control system 40. The processes illustrated in FIG. 2 are realized by causing the CPU 42 to execute a program stored in the ROM 44. A base target torque calculating process M10 is a process of calculating a base target torque Thb* which is a base value of a target steering torque Th* which is to be input to the steering shaft 24 by a driver via the steering wheel 22 based on an axial force Taf which will be described later. Here, the axial force Taf is a force in an axial direction which is applied to the rack shaft 26. Since the axial force Taf is an amount corresponding to a lateral force acting on the turning wheels 12, the lateral force can be ascertained from the axial force Taf. On the other hand, a torque which is to be input to the steering shaft 24 by a driver via the steering wheel 22 is preferably determined based on the lateral force. Accordingly, the base target torque calculating process M10 is a process of calculating the base target torque Thb* based on the lateral force which is ascertained from the axial force Taf.

Specifically, the base target torque calculating process M10 is a process of calculating the magnitude of the base target torque Thb* to be less when the magnitude (the absolute value) of the axial force Taf is the same and the vehicle speed V is low than when the vehicle speed V is high. This can be realized, for example, by causing the CPU 42 to map-calculate the base target torque Thb* in a state in which map data with the axial force Taf or a lateral acceleration which is ascertained from the axial force Taf and the vehicle speed V as input variables and with the base target torque Thb* as an output variable is stored in the ROM 44 in advance. Here, map data is pair data of discrete values of the input variables and values of the output variables corresponding to the values of the input variables. For example, the map calculation is a process of outputting the value of the corresponding output variable of the map data as a result of calculation when a value of one input variable matches one of the values of the input variables of the map data and outputting a value obtained by interpolation of values of a plurality of output variables included in the map data as a result of calculation when the value of one input variable does not match one value of the input variables.

A hysteresis process M14 is a process of calculating and outputting a hysteresis correction amount Thys for correcting the base target torque Thb* based on a rotational angle of the pinion shaft 24c (a pinion angle θp) which is a convertible angle which can be converted to the turning angle of the turning wheels 12. Specifically, the hysteresis process M14 includes a process of identifying switching forward and switching back of the steering wheel 22 based on a change of the pinion angle θp or the like and calculating a hysteresis correction amount Thys such that the magnitude of the target steering torque Th* is greater at the time of switching forward than at the time of switching back. Specifically, the hysteresis process M14 includes a process of setting the hysteresis correction amount Thys to be variable based on a vehicle speed V.

An addition process M12 is a process of calculating the target steering torque Th* by adding the hysteresis correction amount Thys to the base target torque Thb*. A steering operation amount calculating process M16 is a process of calculating a steering operation amount Ts* which is an operation amount for controlling a steering torque Th to the target steering torque Th* by feedback control. The steering operation amount Ts* is an amount including an operation amount for controlling the steering torque Th to the target steering torque Th* by feedback control and may include a feed-forward term. An operation amount for feedback control is an amount for increasing the magnitude (the absolute value) of a required torque for the electric motor 32, for example, when signs of both the steering torque Th and the target steering torque Th* are positive and the steering torque Th is greater than the target steering torque Th*. The steering operation amount Ts* is an amount corresponding to the required torque Td for the electric motor 32 in feedback control of the steering torque Th to the target steering torque Th*, and the steering operation amount Ts* is an amount which has been converted to a torque which is applied to the steering shaft 24 in this embodiment.

An axial force calculating process M18 is a process of calculating the axial force Taf by adding the steering torque Th to the steering operation amount Ts*. Since the steering torque Th is a torque which is applied to the steering shaft 24, the axial force Taf in this embodiment has a value obtained by converting a force which is applied to the rack shaft 26 in the axial direction to a torque which is applied to the steering shaft 24.

A normative model calculating process M20 is a process of calculating a pinion angle command value θp* which is a command value of the pinion angle θp based on the axial force Taf. Specifically, the normative model calculating process M20 is a process of calculating the pinion angle command value θp* using a model formula which is expressed by Expression (c1).

$$Taf = K \cdot \theta p^* + C \cdot \theta p^{*\prime} + J \cdot \theta p^{*\prime\prime} \quad \text{(c1)}$$

The model expressed by Expression (c1) is a model of a value which is indicated by the pinion angle θp when the same amount of torque as the axial force Taf is input to the steering shaft 24. In Expression (c1), a stickiness coefficient C is a model of friction of the electric power steering system 10 or the like, an inertia coefficient J is a model of an inertia of the electric power steering system 10, and an elasticity coefficient K is a model of specifications such as suspension and wheel alignment of a vehicle in which the electric power steering system 10 is mounted. This model is not a model that accurately expresses the actual electric power steering system 10 or the vehicle in which the electric power steering system 10 is mounted, but is a normative model which is designed to change behavior of the turning angle with an input to ideal behavior. In this embodiment, it is possible to adjust a feeling of steering by designing a normative model.

Specifically, in a subtraction process M21, a stickiness term "C·θp*'," a spring term "K·θp*," and a reaction force Trv are subtracted from the axial force Taf. In an inertia coefficient dividing process m21, the output of the subtraction process m21 is divided by the inertia coefficient J, whereby a pinion angular acceleration command value αp* (=θp*") is calculated. Then, in an integration process M23 with the pinion angular acceleration command value αp* as an input, a pinion angular velocity command value ωp* (=θp*') is calculated. In an integration process M24 with the pinion angular velocity command value ωp* as an input, the pinion angle command value θp* is calculated.

A stickiness coefficient multiplying process M25 is a process of calculating a stickiness term "C·θp*'" by multiplying the pinion angular velocity command value ωp* by the stickiness coefficient C. An elasticity coefficient multiplying process M26 is a process of calculating a spring term "K·θp*'" by multiplying the pinion angle command value θp* by the elasticity coefficient K.

A reaction force calculating process M30 is a process of calculating a reaction force Trv based on the pinion angle command value θp* or the pinion angular velocity command value ωp*. An integration process M40 is a process of calculating an integrated value Inθ of the rotational angle θm of the electric motor 32. In this embodiment, the turning angle of the turning wheels 12 when the vehicle moves straightly is set to "0" and the integrated value Inθ when the turning angle is "0" is set to "0." A conversion process M42 is a process of calculating the pinion angle θp by dividing the integrated value Inθ by a reduction gear ratio Km from the steering shaft 24 to the electric motor 32. The pinion angle θp represents a straight traveling direction when it is "0" and represents a right turning angle or a left turning angle depending on whether it is positive or negative.

An angle operation amount calculating process M50 is a process of calculating an angle operation amount Tt* which is an operation amount for controlling the pinion angle θp to the pinion angle command value θp* by feedback control. The angle operation amount Tt* is an amount corresponding to the required torque Td for the electric motor 32 in feedback control of the pinion angle θp to the pinion angle command value θp*, and is an amount which is converted to a torque which is applied to the steering shaft 24 in this embodiment.

The angle operation amount calculating process M50 includes a disturbance observer M52 of estimating a torque affecting the pinion angle θp as a disturbance torque in addition to the angle operation amount Tt* and the steering torque Th and setting it as an estimated disturbance torque Tlde. In this embodiment, the estimated disturbance torque Tlde is converted to a torque which is applied to the steering shaft 24.

The disturbance observer M52 calculates the estimated disturbance torque Tlde or an estimated value θpe by Expression (c2) using an inertia coefficient Jp, the estimated value θpe of the pinion angle θp, the angle operation amount Tt0*, and a matrix L of three rows and one column for defining observer gains 11, 12, and 13. The inertia coefficient Jp is a model of an inertia of the electric power steering system 10 and represents the actual inertia of the electric power steering system 10 with higher accuracy than that of the inertia coefficient J.

$$\dot{X}e = AXe + B(Tt0* + Tlde) - L(\theta pe - \theta p) \quad \text{(c2)}$$

$$Xe = \begin{pmatrix} \theta pe \\ \dot{\theta} pe \\ Tlde \end{pmatrix}$$

$$A = \begin{pmatrix} 0 & 1 & 0 \\ 0 & 0 & \dfrac{1}{Jp} \\ 0 & 0 & 0 \end{pmatrix}$$

$$B = \begin{pmatrix} 0 \\ \dfrac{1}{Jp} \\ 0 \end{pmatrix}$$

$$l = \begin{pmatrix} l1 \\ l2 \\ l3 \end{pmatrix}$$

A differentiation calculating process M54 is a process of calculating a pinion angular velocity command value by a differentiation calculation of the pinion angle command value θp*.

A feedback term calculating process M56 is a process of calculating a feedback operation amount Ttfb which is a sum of a proportional term based on a difference between the pinion angle command value θp* and the estimated value θpe and a differential term based on a difference between a differential value of the pinion angle command value θp* and a differential value of the estimated value θpe.

A second-order differentiation process M58 is a process of calculating a second-order time differential value of the pinion angle command value θp*. A feed-forward term calculating process M60 is a process of calculating a feed-forward operation amount Ttff by multiplying an output value of the second-order differentiation process M58 by the inertia coefficient Jp. A two-degree-of-freedom operation amount calculating process M62 is a process of calculating an angle operation amount Tt0* by subtracting the estimated disturbance torque Tlde from a sum of the feedback operation amount Ttfb and the feed-forward operation amount Ttff.

A steering torque compensating process M72 is a process of calculating the angle operation amount Tt* which is an output of the angle operation amount calculating process M50 by subtracting the steering torque Th from the angle operation amount Tt0*. An addition process M74 is a process of calculating the required torque Td for the electric motor 32 by adding the angle operation amount Tt* to the steering operation amount Ts*.

A conversion process M76 is a process of converting the required torque Td to a torque command value Tm* which is a command value of the torque for the electric motor 32 by dividing the required torque Td by the reduction gear ratio Km.

An operation signal generating process M78 is a process of generating and outputting an operation signal MSt of the inverter 33 for controlling the torque for the electric motor 32 to the torque command value Tm*. The operation signal MSt is actually an operation signal for each arm of each leg of the inverter 33.

Figure 3:
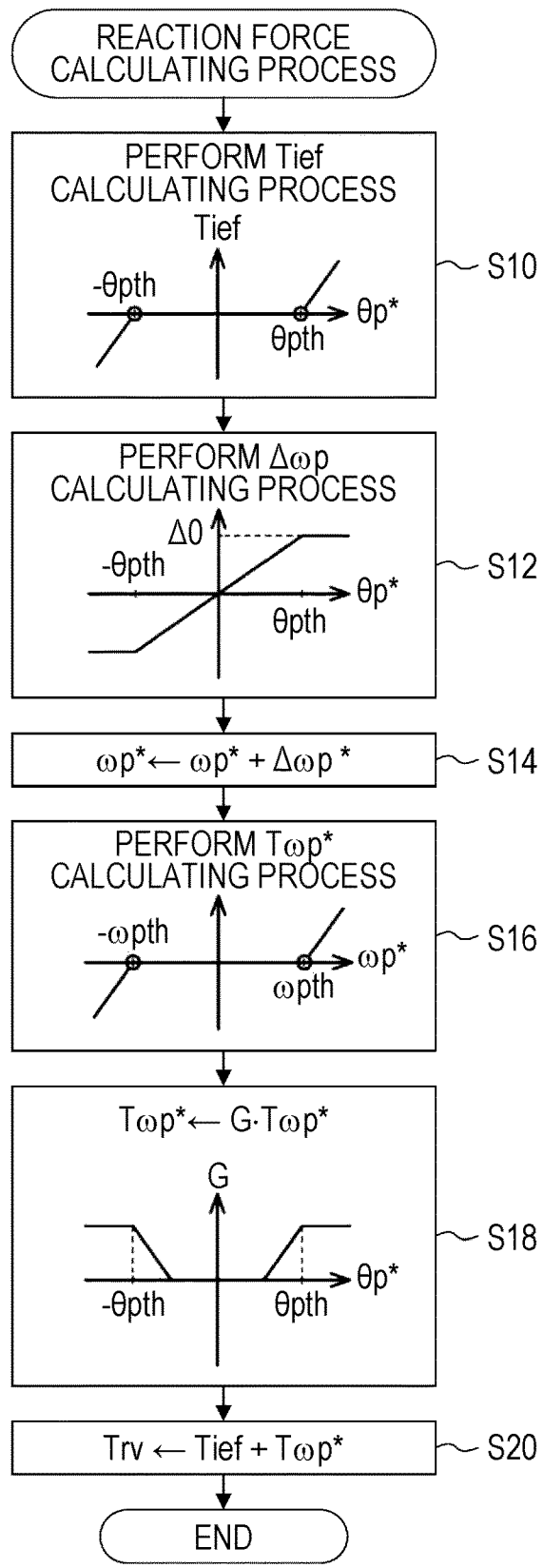
FIG. 3 is a flowchart illustrating a flow of a reaction force calculating process according to the first embodiment.

FIG. 3 illustrates a flow of the reaction force calculating process M30. The process flow illustrated in FIG. 3 is realized by causing the CPU 42 to repeatedly execute a program stored in the ROM 44, for example, at intervals of a predetermined period. In the following description, a numeral prefixed with "S" denotes a step number of each process.

In the series of processes illustrated in FIG. 3, the CPU 42 first calculates a virtual reaction force Tief (S10). The virtual reaction force Tief has a value greater than "0" immediately before the magnitude of a displacement in the axial direction of the rack shaft 26 reaches a maximum value which is determined by the rack housing 16, and serves to regulate displacement to the maximum value.

Specifically, the CPU 42 sets the virtual reaction force Tief to "0" when the magnitude of the pinion angle command value θp* is less than a threshold value θpth, and sets the magnitude (absolute value) of the virtual reaction force Tief to a great value when the magnitude of the pinion angle command value θp* is equal to or greater than the threshold value θpth and the magnitude of the pinion angle command value θp* is great than when the magnitude of the pinion angle command value θp* is small. The threshold value θpth is set to the pinion angle θp immediately before the magnitude of the displacement in the axial direction of the rack shaft 26 reaches the maximum value which is determined by the rack housing 16. Specifically, in the process of S10, the CPU 42 map-calculates the virtual reaction force Tief based on the pinion angle command value θp* in a state in which map data with the pinion angle θp as an input variable and with the virtual reaction force Tief as an output variable is stored in the ROM 44 in advance.

Then, the CPU 42 calculates an offset amount Δωp* (S12). The CPU 42 sets the magnitude (absolute value) of the offset amount Δωp* to a greater value when the magnitude of the pinion angle command value θp* is great than when the magnitude of the pinion angle command value θp* is small, and sets the offset amount Δωp* to a maximum value Δ0 before the pinion angle command value θp* reaches the threshold value θpth. The offset amount Δωp* has the same sign as the pinion angle command value θp*. Specifically, the CPU 42 map-calculates the offset amount Δωp* in a state in which map data with the pinion angle θp as an input variable and with the offset amount Δωp* as an output variable is stored in the ROM 44 in advance.

Then, the CPU 42 substitutes a value obtained by adding the offset amount Δωp* to the pinion angular velocity command value ωp* into the pinion angular velocity command value ωp* which is an input parameter in the process of S16 which will be described later (S14).

Then, the CPU 42 calculates a sticky reaction force Tωp* based on the pinion angular velocity command value ωp* calculated in the process of S14 (S16). Specifically, the CPU 42 sets the sticky reaction force Tωp* to "0" when the magnitude of the pinion angular velocity command value ωp* is less than a velocity threshold value ωpth, and calculates the sticky reaction force Tωp* to be greater when the magnitude of the pinion angular velocity command value ωp* is equal to or greater than the velocity threshold value ωpth and the magnitude of the pinion angular velocity command value ωp* is great than when the magnitude of the pinion angular velocity command value ωp* is small. Specifically, the CPU 42 map-calculates the sticky reaction force Tωp* in a state in which map data with the angular velocity as an input variable and with the sticky reaction force Tωp* as an output variable is stored in the ROM 44 in advance.

Then, the CPU 42 substitutes a value, which is obtained by multiplying the sticky reaction force Tωp* by a gain G, into the sticky reaction force Tωp* (S18). The CPU 42 sets the gain G to "0" when the magnitude of the pinion angle command value θp* is small, and sets the gain G to be greater when the pinion angle command value θp* is close to the threshold value θpth and the magnitude of the pinion angle command value θp* is great than when the magnitude of the pinion angle command value θp* is small. Here, the CPU 42 sets the gain G to a maximum value before the pinion angle command value θp* reaches the threshold value θpth. Specifically, the CPU 42 map-calculates the gain G in a state in which map data with the pinion angle θp as an input variable and with the gain G as an output variable is stored in the ROM 44 in advance.

Then, the CPU 42 substitutes the sum of the virtual reaction force Tief and the sticky reaction force Tωp* into the reaction force Trv (S20). When the process of S20 is completed, the CPU 42 temporarily ends the process flow illustrated in FIG. 3.

Operations and advantages in this embodiment will be described below. When the steering wheel 22 is operated by a driver, the CPU 42 calculates a target steering torque Th* in response and controls the steering torque Th to the target steering torque Th* by feedback control. The CPU 42 calculates the pinion angle command value θp* based on the sum of the steering operation amount Ts* which is an operation amount for feedback control and the steering torque Th. Then, the CPU 42 calculates an angle operation amount Tt* which is an operation amount for feedback control of the estimated value θpe of the pinion angle θp to the pinion angle command value θp*. Then, the CPU 42 determines a torque command value Tm* based on the sum of the steering operation amount Ts* and the angle operation amount Tt*, and controls the torque for the electric motor 32 to the torque command value Tm*.

Here, when the magnitude of the pinion angle command value θp* is equal to or greater than the threshold value θpth, the CPU 42 calculates the magnitude of the virtual reaction force Tief to be greater than "0." Accordingly, when the axial force Taf is the same and the magnitude of the pinion angle command value θp* is equal to or greater than the threshold value θpth, the magnitude of the pinion angle command value θp* is less likely to increase in comparison with a case in which the magnitude of the pinion angle command value θp* is less than the threshold value θpth. Accordingly, the magnitude of the estimated value θpe is likely to be less than the magnitude of the pinion angle command value θp*. When the magnitude of the estimated value θpe is less than the magnitude of the pinion angle command value θp*, the torque for the electric motor 32 is generated as a torque for decreasing the magnitude of the pinion angle θp and thus a drag force resisting a driver's operation for increasing the magnitude of the pinion angle θp is applied to the steering wheel 22. Accordingly, an operation of the steering wheel 22 for increasing the magnitude of the pinion angle θp to be excessively greater than the threshold value θpth is curbed.

The process of applying a drag force to the steering wheel 22 is realized by a process of operating the reaction force Trv in the normative model calculating process M20 in this embodiment. The normative model calculating process M20 is a process of calculating the pinion angle command value θp* based on a normative model which is designed to adjust a feeling of steering. Accordingly, addition of the reaction force Trv corresponds to change of the normative model when the magnitude of the pinion angle θp reaches the vicinity of the threshold value θpth. Since the angle operation amount calculating process M50 controls the pinion angle θp to the pinion angle command value θp*, controllability of the angle operation amount calculating process M50 is maintained even when the normative model is changed.

On the other hand, for example, when a process of correcting the angle operation amount Tt* based on the reaction force Trv, the value of the estimated disturbance torque Tlde is affected and thus the estimated disturbance torque Tlde becomes an inappropriate value at a time point at which correction based on the reaction force Trv is not performed, and controllability of the pinion angle θp deteriorates.

According to the embodiment described above, following operations and advantages are additionally achieved. The reaction force Trv includes the sticky reaction force Tωp*. Here, the sticky reaction force Tωp* is a parameter which is greater when the magnitude of the pinion angle command value θp* is great than when the magnitude of the pinion angle command value θp* is small and is likely to increase when the magnitude of the pinion angle command value θp* is greater in comparison with the stickiness term "C·ωp*." Accordingly, when the pinion angular velocity command value ωp* has a greater value as the pinion angle command value θp* approaches the threshold value ωpth, the sticky reaction force Tωp* has a great value for decreasing the magnitude thereof. Accordingly, it is possible to curb an excessive increase of the magnitude of the pinion angular velocity command value ωp* when the pinion angle command value θp* approaches the threshold value θpth. On the other hand, when the magnitude of the rate of change of the pinion angle command value θp* when the pinion angle command value θp* is greater than the threshold value θpth is great, an impact due to collision between the drag force which is applied to the steering wheel 22 based on the virtual reaction force Tief and a force for increasing the magnitude of the pinion angle command value θp* may increase Through the normative model calculating process M20, the pinion angle command value θp* is calculated and the pinion angle θp is controlled to the pinion angle command value θp* based on Expression (c1) which expresses a normative model. Accordingly, it is possible to adjust steering characteristics using the normative model.

The target steering torque Th* is set based on the sum of the steering operation amount Ts* and the steering torque Th. Here, a target torque which is required for improving a feeling of steering for a driver is likely to be determined based on a lateral force. On the other hand, since the sum of the steering operation amount Ts* and the steering torque Th can be converted to a lateral force of the vehicle, it is possible to easily design the process of calculating the target steering torque Th* by determining the target steering torque Th* based on the sum.

Hereinafter, a second embodiment will be described with reference to the accompanying drawings with a focus on differences from the first embodiment.

Figure 4:
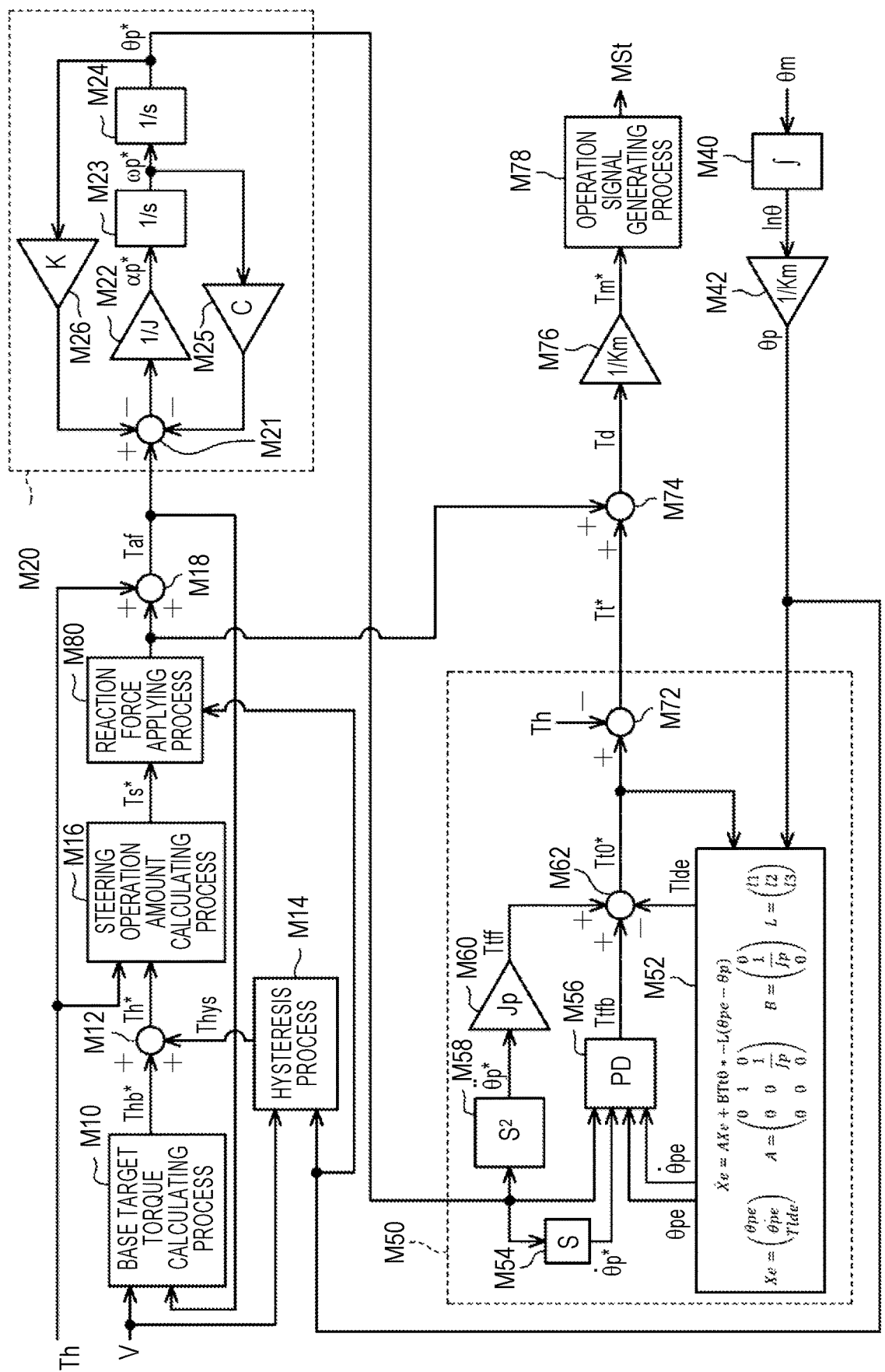
FIG. 4 is a block diagram illustrating processes which are performed by a turning control system according to a second embodiment.

FIG. 4 illustrates some processes which are performed by the turning control system 40 according to this embodiment. The process flow illustrated in FIG. 4 is realized by causing the CPU 42 to execute a program stored in the ROM 44. The processes in FIG. 4 corresponding to the processes illustrated in FIG. 2 are referred to by the same step numbers for the purpose of convenience.

In this embodiment, the steering operation amount Ts* which is output from the steering operation amount calculating process M16 is input to a reaction force applying process M80. The steering operation amount Ts* which has been subjected to correction in the reaction force applying process M80 is input to the axial force calculating process M18 and is also input to the addition process M74. In this embodiment, the normative model calculating process M20 does not include the reaction force calculating process M30.

Figure 5:
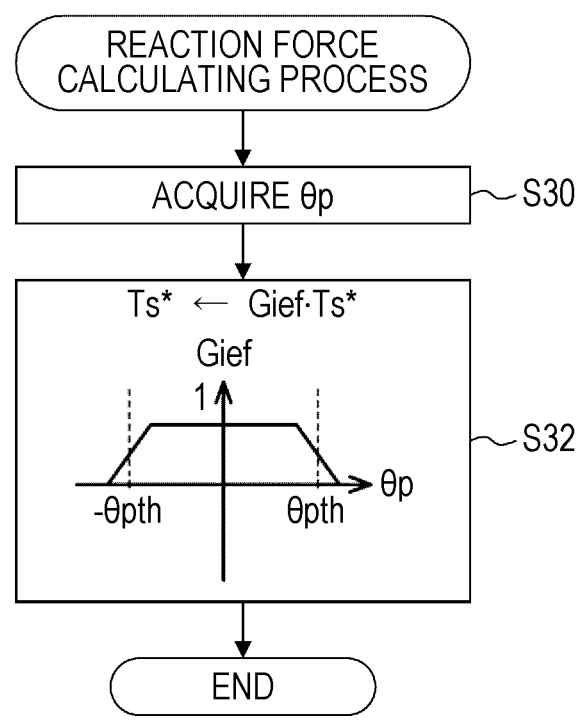
FIG. 5 is a flowchart illustrating a flow of a reaction force calculating process according to the second embodiment.

FIG. 5 illustrates a flow of the reaction force applying process M80. The process flow illustrated in FIG. 5 is realized by causing the CPU 42 to repeatedly execute a program stored in the ROM 44, for example, at intervals of a predetermined period.

In a series of processes illustrated in FIG. 5, first, the CPU 42 acquires a pinion angle θp (S30). Then, the CPU 42 substitutes a value, which is obtained by multiplying the steering operation amount Ts* output from the steering operation amount calculating process M16 by a gain Gief, into the steering operation amount Ts* (S32). Here, the CPU 42 fixes the gain Gief to "1" when the magnitude of the pinion angle θp is small, and sets the gain Gief to a less value when the pinion angle θp approaches the threshold value θpth and the magnitude of the pinion angle θp is great than when the magnitude of the pinion angle θp is small. The gain Gief has a value of from "0" to "1."

In addition, when the process of S32 is completed, the CPU 42 temporarily ends the series of processes illustrated in FIG. 5. Operations and advantages in this embodiment will be described below.

By setting the gain Gief to a value less than "1" when the magnitude of the pinion angle θp approaches the threshold value θpth, the CPU 42 corrects the magnitude of the steering operation amount Ts* which is used for the process of calculating the axial force Taf to decrease. Accordingly, even when the steering operation amount Ts* calculated in the steering operation amount calculating process M16 is the same, the magnitude of the pinion angle command value θp* is less likely to increase when the pinion angle command value θp* is equal to or greater than the threshold value θpth than when the pinion angle command value θp* is less than the threshold value θpth. Accordingly, the magnitude of the pinion angle command value θp* is likely to be less than the magnitude of the estimated value θpe. When the magnitude of the pinion angle command value θp* is less than the magnitude of the estimated value θpe, the torque for the electric motor 32 generates a torque for decreasing the magnitude of the pinion angle θp and thus a force in a direction opposite to a driver's operation is applied to the steering wheel 22. Accordingly, an operation of the steering wheel 22 for increasing the magnitude of the pinion angle θp to be excessively greater than the threshold value θpth is curbed.

Hereinafter, a third embodiment will be described with reference to the accompanying drawings with a focus on differences from the first embodiment.

Figure 6:
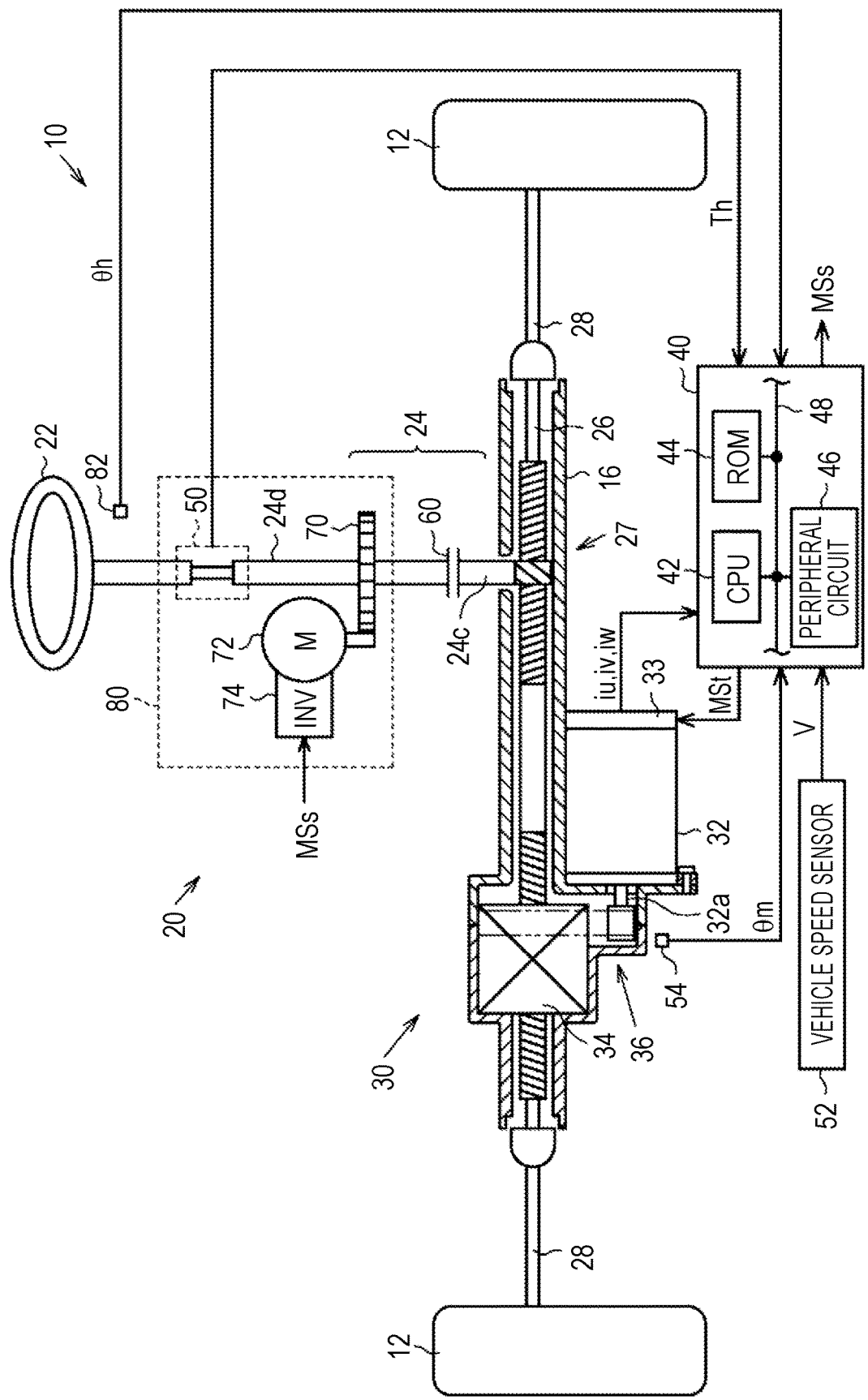
FIG. 6 is a diagram illustrating an electric power steering system according to a third embodiment.

FIG. 6 illustrates a configuration of an electric power steering system 10 according to this embodiment. Elements in FIG. 6 corresponding to the elements illustrated in FIG. 1 are referred to by the same reference signs for the purpose of convenience.

In this embodiment, a clutch 60 that can cut off transmission of power to and from the steering wheel 22 is provided in the pinion shaft 24c. That is, the pinion shaft 24c is connected to one end of the clutch 60 and an input shaft 24d that is connected to the steering wheel 22 is connected to the other end of the clutch 60. In this embodiment, the input shaft 24d and the pinion shaft 24c are referred to as the steering shaft 24.

Power of an electric motor 72 is applied to the input shaft 24d via a reduction gear 70. A voltage of an inverter 74 is applied to terminals of the electric motor 72. A drag force actuator 80 is constituted by the input shaft 24d, the reduction gear 70, the electric motor 72, and the inverter 74. In this embodiment, the turning control system 40 refers to a rotational angle (a steering angle θh) of the steering wheel 22 which is detected by a steering angle sensor 82.

Figure 7:
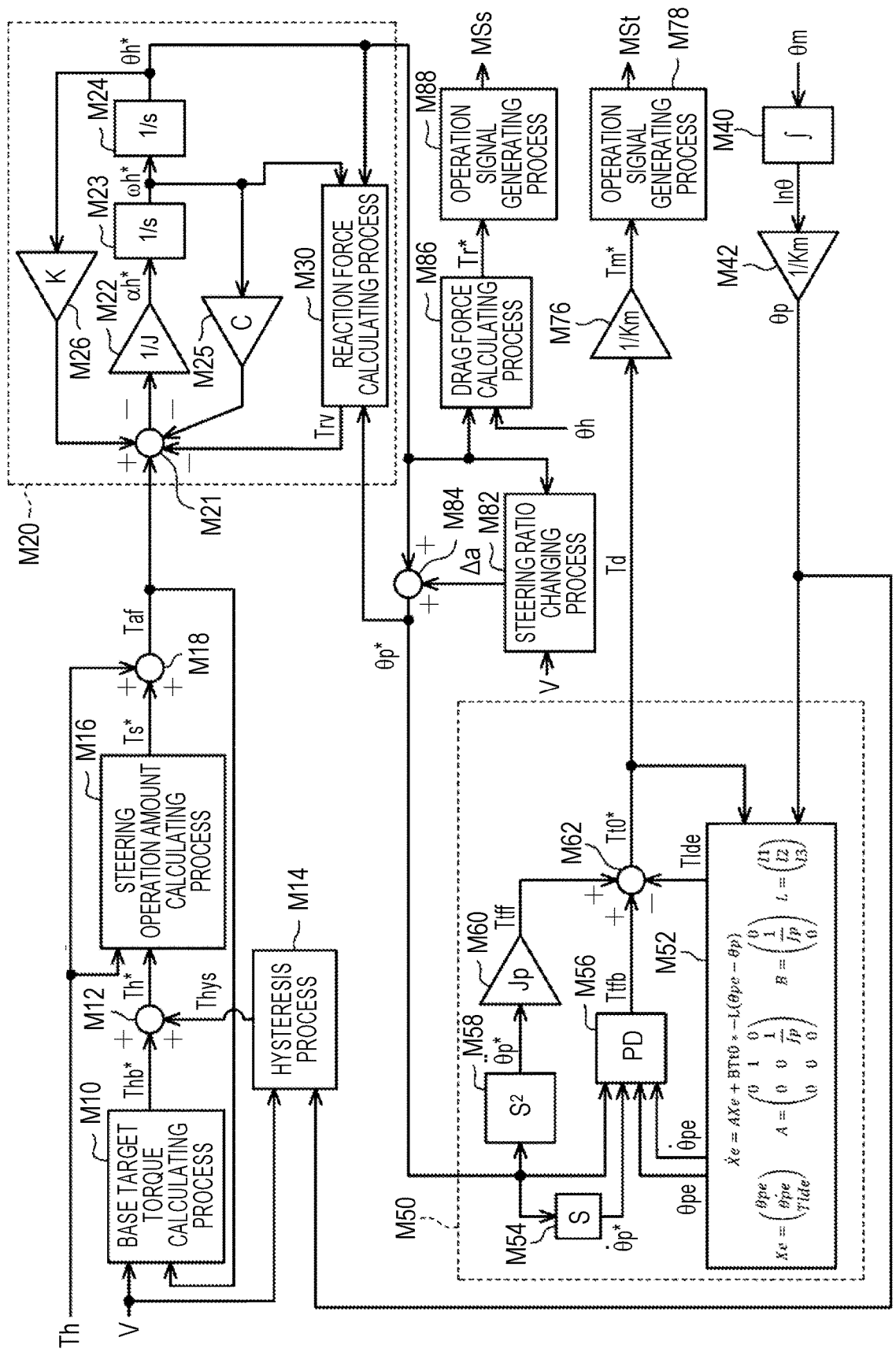
FIG. 7 is a block diagram illustrating processes which are performed by a turning control system according to the third embodiment.

FIG. 7 illustrates some processes which are performed by the turning control system 40 according to this embodiment. The process flow illustrated in FIG. 7 is realized by causing the CPU 42 to execute a program stored in the ROM 44. The processes in FIG. 7 corresponding to the processes illustrated in FIG. 2 are referred to by the same step numbers for the purpose of convenience.

As illustrated in FIG. 7, in this embodiment, a command value of a steering angle (a steering angle command value θh*), a steering angular velocity command value ωh*, and a steering angular acceleration command value αh* instead of the pinion angle command value θp*, the pinion angular velocity command value ωp*, and the pinion angular acceleration command value αp* are calculated in the normative model calculating process M20. On the other hand, a steering angle ratio varying process M82 is a process of setting an adjustment amount Δa for varying a steering angle ratio which is a ratio of a target value of the turning angle (the pinion angle command value θp*) to the steering angle command value θh* to be variable based on the vehicle speed V. Specifically, the adjustment amount Δa is set such that the change of the turning angle with the change of the steering angle is greater when the vehicle speed V is low than when the vehicle speed V is high. An addition process M84 sets the pinion angle command value θp* by adding the adjustment amount Δa to the steering angle command value θh*.

A drag force calculating process M86 is a process of calculating a torque command value Tr* for the electric motor 72 as an operation amount for feedback control of the steering angle θh to the steering angle command value θh*. An operation signal generating process M88 is a process of operating the inverter 74 by outputting an operation signal MSs to the inverter 74 to control the torque for the electric motor 72 to the torque command value Tr*.

In this embodiment, the steering torque compensating process M72 is not provided and the output of the angle operation amount calculating process M50 is the angle operation amount Tt0*. In this embodiment, the angle operation amount Tt0* which is output in the angle operation amount calculating process M50 is the required torque Td. That is, in this embodiment, a torque command value Tm* is calculated from only the angle operation amount Tt0*.

Figure 8:
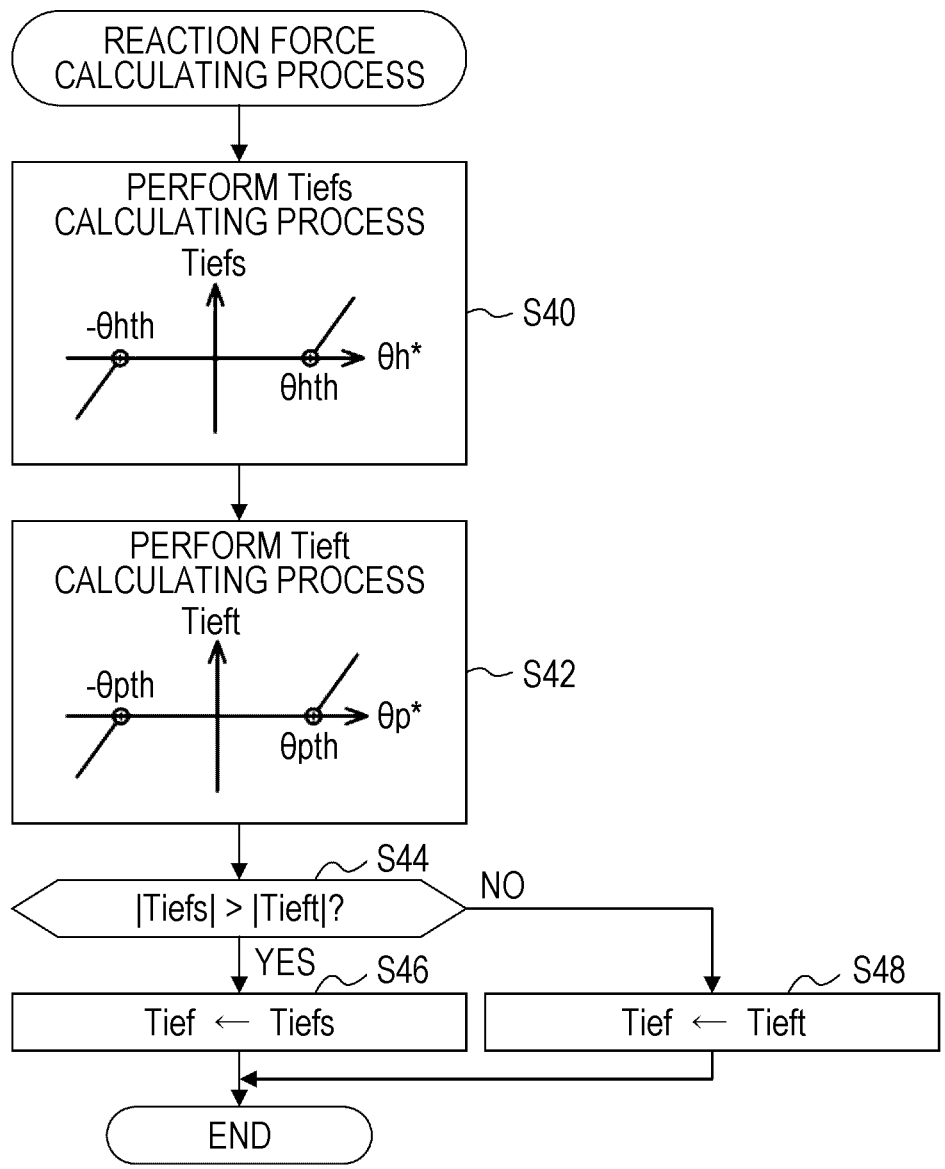
FIG. 8 is a flowchart illustrating a flow of a reaction force calculating process according to the third embodiment.

FIG. 8 illustrates a flow of the reaction force calculating process M30 according to this embodiment. The process flow illustrated in FIG. 8 is realized by causing the CPU 42 to repeatedly execute a program stored in the ROM 44, for example, at intervals of a predetermined period.

In a series of processes illustrated in FIG. 8, first, the CPU 42 calculates a steering-side virtual reaction force Tiefs (S40). Here, the CPU 42 sets the steering-side virtual reaction force Tiefs to "0" when the magnitude of the steering angle θh is less than a threshold value θhth, and calculates the magnitude of the steering-side virtual reaction force Tiefs to be greater when the magnitude of the steering angle θh is equal to or greater than the threshold value θhth and the magnitude of the steering angle θh is great than when the magnitude of the steering angle θh is small. Specifically, the CPU 42 map-calculates the steering-side virtual reaction force Tiefs in a state in which map data with the steering angle θh as an input variable and with the steering-side virtual reaction force Tiefs as an output variable is stored in the ROM 44 in advance.

Then, the CPU 42 calculates an angle-side virtual reaction force Tieft (S42). Specifically, the CPU 42 sets the angle-side virtual reaction force Tieft to "0" when the magnitude of the pinion angle command value θp* is less than the threshold value θpth, and calculates the magnitude of the angle-side virtual reaction force Tieft to be greater when the magnitude of the pinion angle command value θp* is equal to or greater than the threshold value θpth and the magnitude of the pinion angle command value θp* is great than when the magnitude of the pinion angle command value θp* is small. The threshold value θpth is set to the pinion angle θp immediately before the magnitude of the displacement in the axial direction of the rack shaft 26 becomes a maximum value which is determined by the rack housing 16. Specifically, the CPU 42 map-calculates the angle-side virtual reaction force Tieft based on the pinion angle command value θp* in a state in which map data with the pinion angle θp as an input variable and with the angle-side virtual reaction force Tieft as an output variable is stored in the ROM 44 in advance.

Then, the CPU 42 determines whether the magnitude of the steering-side virtual reaction force Tiefs is greater than the magnitude of the angle-side virtual reaction force Tieft (S44). Then, when it is determined that the magnitude of the steering-side virtual reaction force Tiefs is greater (S44: YES), the CPU 42 substitutes the steering-side virtual reaction force Tiefs into the reaction force Trv (S46). On the other hand, when it is determined that the magnitude of the steering-side virtual reaction force Tiefs is equal to or less than the magnitude of the angle-side virtual reaction force Tieft (S44: NO), the CPU 42 substitutes the angle-side virtual reaction force Tieft into the reaction force Trv (S48).

In addition, when the processes of S46 and S48 are completed, the CPU 42 temporarily ends the series of processes illustrated in FIG. 7. According to the embodiment described above, the following operations and advantages are additionally achieved in addition to advantages corresponding to the advantages in the first embodiment.

The reaction force Trv includes the steering-side virtual reaction force Tiefs. Accordingly, when the magnitude of the steering angle θh is greater than the threshold value θhth, it is possible to prevent the steering wheel 22 from being operated such that the magnitude of the steering angle θh becomes greater. Accordingly, when the maximum value of the steering angle θh is determined depending on its structure or the like, it is possible to curb an excessive increase of the magnitude of the steering torque Th or the steering angular velocity at the maximum value. An example of the factor for defining the maximum value is a factor which is determined by a spiral cable in a structure in which an electronic device is provided in the steering wheel 22 and electric power is supplied to the electronic device via the spiral cable. That is, since an excessive force may be applied to the spiral cable when the magnitude of the steering angle is intended to be greater than the maximum value, the maximum value of the magnitude of the steering angle θh is regulated from a viewpoint of protection of the spiral cable.

Correspondence between elements in the above-mentioned embodiments and elements described in the "SUMMARY" is as follows. In the following description, the correspondence is described for each number in the configurations described in the "SUMMARY." [1] The angle command value calculating process corresponds to the normative model calculating process M20 in FIGS. 2 and 4 or the normative model calculating process M20, the steering angle ratio varying process M82, and the addition process M84 in FIG. 7. The convertible angle corresponds to the pinion angle θp. The operation process corresponds to the addition process M74, the conversion process M76, and the operation signal generating process M78. The correction process corresponds to the process of subtracting the reaction force Trv in the process of S10 from the axial force Taf in the subtraction process M21, the process of S32, or the process of subtracting the reaction force Trv from the axial force Taf in the subtraction process M21 in FIG. 7. The drive circuit corresponds to the inverter 33. [2] The elastic force corresponds to the sum of the elasticity term "K·θp*" and the virtual reaction force Tief. [3] The sticky force corresponds to the sum of the stickiness term "C·θp*'" and the sticky reaction force Tωp*. The stickiness adjusting process corresponds to the processes of S12 to S18. [4] The process corresponds to the process of S32. [5] The process corresponds to the processes in FIGS. 7 and 8. [6] The process corresponds to the processes in FIG. 7. [7] The target steering torque calculating process corresponds to the base target torque calculating process M10, the addition process M12, and the hysteresis process M14.

The embodiments can be modified as follows. The embodiments described above and modified examples described below can be combined with each other as long as no technical contradictions arise.

Correction Process

For example, in the process of S10, instead of the pinion angle command value θp*, the virtual reaction force Tief may be calculated based on the pinion angle θp or the virtual reaction force Tief may be calculated based on the estimated value θpe. For example, in the process of S32, instead of the pinion angle θp, the gain Gief may be calculated based on the estimated value θpe or the gain Gief may be calculated based on the pinion angle command value θp*.

For example, in the process of S42, instead of the pinion angle command value θp*, the angle-side virtual reaction force Tieft may be calculated based on the pinion angle θp or the angle-side virtual reaction force Tieft may be calculated based on the estimated value θpe. For example, in the process of S40, the steering-side virtual reaction force Tiefs may be calculated based on the steering angle θh instead of the steering angle command value θh*.

For example, by replacing the threshold value θhth with the smaller value of the threshold value θhth in the process of S40 and the steering angle command value θh* when the pinion angle command value θp* reaches the threshold value θpth, only the process of S40 may be performed and the process of S42 may be deleted. In this case, a logic that the magnitude of the virtual reaction force Tief is set to be greater than "0" when the steering angle command value θh* is equal to or greater than the threshold value θhth is established, but a process of setting the magnitude of the virtual reaction force Tief to be greater than "0" even when the pinion angle command value θp* is equal to or greater than the threshold value θpth like the process of S42 may be employed. In this process, the threshold value θhth is preferably set to be variable depending on the steering angle ratio. Here, the setting to be variable is not necessary. For example, by replacing the threshold value θpth with the smaller value of the threshold value θpth in the process of S42 and the pinion angle command value θp* when the steering angle command value θh* reaches the threshold value θhth, only the process of S42 may be performed and the process of S40 may be deleted. In this case, the threshold value θpth is preferably set to be variable depending on the steering angle ratio. Here, the setting to be variable is not necessary.

In the process flow illustrated in FIG. 4, the reaction force applying process M80 corrects the magnitude of the steering operation amount Ts* to decrease, but the disclosure is not limited thereto. For example, in the steering operation amount calculating process M16, a correction process of decreasing the magnitude of the steering operation amount Ts* may be performed. Accordingly, for example, when the steering operation amount calculating process M16 calculates the steering operation amount Ts* using an integral element, it is possible to prevent deterioration in controllability of torque feedback control. The disclosure is not limited thereto and, for example, a value maintained by the integral element may be corrected to decrease based on the correction amount by which the steering operation amount Ts* is corrected to decrease in the reaction force applying process M80 when the integral element is used to calculate the steering operation amount Ts*.

Stickiness Adjusting Process

For example, the process of S18 in the process flow illustrated in FIG. 3 may be deleted and the sticky reaction force Tωp* calculated in the process of S16 may be added to the virtual reaction force Tief in the process of S20. For example, the processes of S12 and S14 may be deleted in the process flow illustrated in FIG. 3.

In the process flow illustrated in FIG. 4, the sticky reaction force Tωp* is not used for the process of calculating the pinion angle command value θp*, but may be used. In the process flow illustrated in FIG. 8, the sticky reaction force Tωp* is not used for the process of calculating the pinion angle command value θp*, but may be used. Here, the sticky reaction force may be calculated, for example, based on only a time differential value of the pinion angle command value θp* or may be calculated, for example, based on only a time differential value of the steering angle command value θh*. For example, the sticky reaction force may be calculated based on both the time differential value of the pinion angle command value θp* and the time differential value of the steering angle command value θh*. This can be realized, for example, by calculating the sticky reaction force based on the not less value of the time differential value of the pinion angle command value θp* and the time differential value of the steering angle command value θh*.

The physical quantity indicating an angular velocity of the turning angle which is an angular velocity used to calculate the sticky reaction force is not limited to a command value and may be, for example, a time differential value of the pinion angle θp, a time differential value of the estimated value θpe, or a time differential value of the steering angle θh.

Required Torque Td

In FIGS. 2 and 4, the sum of the angle operation amount Tt* and the steering operation amount Ts* is used as the required torque Td, but the disclosure is not limited thereto. For example, the angle operation amount Tt* may be used as a required torque.

In the process flow illustrated in FIG. 7, the angle operation amount Tt* is used as the required torque Td, but the disclosure is not limited thereto. For example, the sum of the angle operation amount Tt* and the steering operation amount Ts* may be used as the required torque Td.

Angle Command Value Calculating Process

In the above-mentioned embodiments, the pinion angle command value θp* or the steering angle command value θh* is calculated using the axial force Taf as an input, but the disclosure is not limited thereto and, for example, the steering operation amount Ts* may be used as an input. In the above-mentioned embodiments, the pinion angle command value θp* or the steering angle command value θh* is calculated based on Expression (c1) or the like using the axial force Taf as an input, but a logic (model) for calculating the pinion angle command value θp* or the steering angle command value θh* is not limited thereto.

For example, in the process flow illustrated in FIG. 6, the steering angle ratio varying process M82 and the addition process M84 may be deleted and the output of the normative model calculating process M20 may be used as the steering angle command value θh* and the pinion angle command value θp*.

Disturbance Observer

In the above-mentioned embodiments, the disturbance observer is constituted by a simple model in which the torque acting on the turning wheels 12 is balanced with a torque proportional to the angular acceleration of the turning angle, but the disclosure is not limited thereto. For example, the disturbance observer may be constituted by a model in which the torque acting on the turning wheels 12 is balanced with the sum of a torque proportional to the angular acceleration of the turning angle and a torque proportional to the angular velocity of the turning angle.

A method of calculating the estimated disturbance torque Tlde is not limited to the examples described in the embodiments. For example, in the process flow illustrated in FIG. 2, the estimated disturbance torque Tlde may be calculated by subtracting the angle operation amount Tt*, the steering operation amount Ts*, and the steering torque Th from a value obtained by multiplying the second-order time differential value of the pinion angle command value θp* or the second-order time differential value of the pinion angle θp by the inertia coefficient Jp.

Angle Operation Amount Calculating Process

In the above-mentioned embodiments, the feed-forward operation amount Ttff is calculated based on the second-order time differential value of the pinion angle command value θp*, but the disclosure is not limited thereto and, for example, the feed-forward operation amount Ttff may be calculated based on the second-order time differential value of the pinion angle θp or the second-order time differential value of the estimated value θpe.

In the above-mentioned embodiments, the feed-forward term is calculated by modeling the electric power steering system 10 using a simple model in which the torque acting on the turning wheels 12 is balanced with a torque proportional to the angular acceleration of the turning wheels, but the disclosure is not limited thereto. For example, the feed-forward term may be calculated using a model in which the torque acting on the turning wheels 12 is balanced with the sum of a torque proportional to the angular acceleration of the turning wheels and a torque proportional to the angular velocity of the turning wheels. This can be realized, for example, using the sum of a value obtained by multiplying the second-order time differential value of the pinion angle command value θp* by the inertia coefficient Jp and a value obtained by multiplying the first-order time differential value of the pinion angle command value θp* by the stickiness coefficient Cp as the feed-forward operation amount Ttff. Here, the stickiness coefficient Cp which is a proportionality coefficient of the angular velocity is different from the stickiness coefficient C which is used in the normative model calculating process M20 in purpose thereof, and is preferably obtained by modeling actual behavior of the electric power steering system 10 with maximum accuracy.

A feedback control amount out of the inputs of the feedback term calculating process M56 is not limited to the estimated value θpe or the first-order time differential value thereof. For example, the pinion angle θp or the time differential value thereof may be used instead of the estimated value θpe or the first-order time differential value thereof.

The feedback term calculating process M56 is not limited to the process of outputting the sum of the output values of a proportional element and a differential factor. For example, the output value of a proportional factor may be output or, for example, an output value of a differential factor may be output. For example, a process of outputting the sum of at least one of the output value of a proportional factor and the output value of a differential factor and the output value of an integral factor may be employed. When the output value of an integral factor is used, the disturbance observer is preferably deleted. Above all, when the output value of an integral factor is not used, the disturbance observer is not necessarily used.

Convertible Angle

In the above-mentioned embodiments, the pinion angle θp is used as the convertible angle, but the disclosure is not limited thereto. For example, the turning angle of the turning wheels may be used.

Steering Operation Amount

In the above-mentioned embodiments, the steering operation amount Ts* is converted to a torque for the steering shaft 24, but the disclosure is not limited thereto. For example, it may be converted to the torque for the electric motor 32. In this case, for example, the sum of a value obtained by dividing the steering torque Th by the reduction gear ratio Km and the steering operation amount Ts* may be used as the axial force Taf or the sum of a value obtained by multiplying the steering operation amount Ts* by the reduction gear ratio Km and the steering torque Th may be used as the axial force Taf.

Angle Operation Amount

In the above-mentioned embodiments, the angle operation amount Tt* is converted to the torque for the steering shaft 24, but the disclosure is not limited thereto. For example, it may be converted to the torque for the electric motor 32. Here, for example, when the steering operation amount Ts* is converted to the torque for the steering shaft 24, the sum of a value obtained by multiplying the angle operation amount Tt* by the reduction gear ratio Km and the steering operation amount Ts* may be used as the required torque Td.

The base target torque calculating process is not limited to the process of calculating the base target torque Thb* based on the axial force Taf and the vehicle speed V. For example, a process of calculating the base target torque Thb* based on only the axial force Taf may be employed.

The process of correcting the base target torque Thb* using the hysteresis correction amount Thys is not necessary. The turning control system is not limited to a system that includes the CPU 42 and the ROM 44 and performs software processes. For example, a dedicated hardware circuit (for example, an ASIC) that performs at least a part of the software processes performed in the above-mentioned embodiments in hardware may be provided. That is, the turning control system may have at least one of the following configurations of (a) to (c). (a) A processor that performs all the processes in accordance with a program and a program storage device such as a ROM that stores the program are provided. (b) A processor that performs some of the processes in accordance with a program, a program storage device, and a dedicated hardware circuit that performs the other processes are provided. (c) A dedicated hardware circuit that performs all the processes is provided. Here, the number of software processing circuits including a processor and a program storage device or the number of dedicated hardware circuits may be two or more. That is, the processes have only to be performed by a processing circuit including at least one side of one or more software processing circuits and one or more dedicated hardware circuits.

The electric motor is not limited to an SPMSM but may be an IPMSM or the like. The electric motor is not limited to a synchronous machine but may be an induction machine. In addition, for example, the electric motor may be a direct-current electric motor with a brush. In this case, an H-bridged circuit may be employed as the drive circuit.

The turning actuator is not limited to the examples described in the embodiments. For example, a so-called dual pinion type including a second pinion shaft that transmits power of the electric motor 32 to the rack shaft 26 separately from the pinion shaft 24c may be employed. For example, a configuration in which the output shaft 32a of the electric motor 32 is mechanically connected to the steering shaft 24 may be employed. In this case, the turning actuator shares the steering shaft 24 or the rack and pinion mechanism 27 with the steering mechanism.

For example, in FIG. 6, the input shaft 24d may be mechanically connected to the pinion shaft 24c via a gear ratio varying mechanism that varies a gear ratio instead of the clutch 60. In this case, the same processes as described for a steer-by-wire type can also be realized.

What is claimed is:

1. A turning system comprising:
a steering wheel;
a turning actuator that has an electric motor incorporated therein and is configured to turn turning wheels; and
a control device, configured to perform:
a steering operation amount calculating process of calculating, based on an integral element, a steering operation amount, of the electric motor for turning the turning wheels, the steering operation amount being convertible to a first torque required for the electric motor to convert a steering torque input by a driver to a target steering torque by feedback control;
an angle command value calculating process of calculating, based on the steering operation amount, an angle command value of a convertible angle that is convertible to a turning angle of the turning wheels;
a correction process of correcting the integral element such that a drag force resisting an operation of the steering wheel for increasing a magnitude of the turning angle is applied when the magnitude of the turning angle is equal to or greater than a turning angle threshold value;
after the correction process, an angle operation amount calculating process of calculating an angle operation amount that is convertible to a second torque required for the electric motor for converting the convertible angle to the angle command value by feedback control; and
an operation process of operating a drive circuit of the electric motor to control the torque of the electric motor based on the angle operation amount.

2. The turning system according to claim 1, wherein:
the angle command value calculating process includes subtracting an elastic force which is set to be greater when the magnitude of the turning angle is greater than when the magnitude of the turning angle is smaller from the steering operation amount that is an input of the angle command value calculating process and of calculating the angle command value based on a subtracted value; and
the correction process includes increasing an increase of the elastic force with an increase in the magnitude of the turning angle when the magnitude of the turning angle is equal to or greater than the turning angle threshold value.

3. The turning system according to claim 1, wherein:
the angle command value calculating process includes subtracting a sticky force which is set to be greater when magnitude of a turning angular velocity is greater than when the magnitude of the turning angular velocity is smaller from the steering operation amount that is an input of the angle command value calculating process and calculating the angle command value based on the subtracted value, the turning angular velocity is a change rate of the turning angle; and
the control device is configured to perform a stickiness adjusting process of setting the sticky force to be greater when the magnitude of the turning angle is equal to or less than the turning angle threshold value and the magnitude of the turning angle is closer to the turning angle threshold value than when the magnitude of the turning angle is farther from the turning angle threshold value.

4. The turning system according to claim 1, wherein the correction process includes decreasing the magnitude of the steering operation amount that is input to the angle command value calculating process when the magnitude of the turning angle is equal to or greater than the turning angle threshold value.

5. The turning system according to claim 1, wherein:
the steering wheel is attached to a drag force actuator, that is configured to apply the drag force that is a force resisting the operation of the steering wheel to the steering wheel in a state in which transmission of power between the turning wheels and the steering wheel is cut off;
the control device is configured to perform a drag force operating process of operating the drag force actuator in accordance with the angle command value; and
the correction process corrects the integral element such that the drag force resisting the operation of the steering wheel for increasing the magnitude of the turning angle is applied by the drag force actuator when at least one of a condition that the magnitude of a steering angle which is a rotational angle of the steering wheel is equal to or greater than a steering angle threshold value and a condition that the turning angle is equal to or greater than the turning angle threshold value is satisfied.

6. The turning system according to claim 1, wherein the operation process operates the drive circuit such that the torque of the electric motor is controlled based on the angle operation amount regardless of the steering operation amount.

7. The turning system according to claim 1, wherein the control device is configured to perform a target steering torque calculating process of calculating the target steering torque based on a sum of amounts that are obtained by converting the steering operation amount and the steering torque to a force acting on the same object.

* * * * *